United States Patent [19]

Amour

[11] 3,895,596
[45] July 22, 1975

[54] AMPHIBIOUS VEHICLE

[76] Inventor: William E. Amour, 515 S. 13th, Yakima, Wash. 98901

[22] Filed: Mar. 21, 1974

[21] Appl. No.: 453,460

[52] U.S. Cl. .................................. 115/1 R; 115/16
[51] Int. Cl. ................................................ B60f 3/00
[58] Field of Search ........ 115/1 R, 16, 53; 180/1 H, 180/1 R, 7 R, 7 J

[56] References Cited
UNITED STATES PATENTS

| | | | |
|---|---|---|---|
| 3,435,798 | 4/1969 | Rieli | 115/1 R |
| 3,595,199 | 7/1971 | Faxas | 115/1 R |
| 3,688,731 | 9/1972 | Houle | 115/1 R |

*Primary Examiner*—Duane A. Reger
*Assistant Examiner*—Charles E. Frankfort
*Attorney, Agent, or Firm*—John W. Kraft; Charles L. Kraft, II

[57] ABSTRACT

The amphibious vehicle comprises a body-frame, having an inverted U-shaped duct at each rectilinear side of the body frame extending to distally above the ground line; and engine mounted in the body-frame; and a drive train assembly including a row of wheels in each of the ducts, a transmission driving the respective rows of wheels, and deflectors mounted forwardly and above each of the wheels for receiving fluid drawn upwardly by rotation of the wheels, and conduits disposed rectilinearly in the interior top wall of each of the ducts communicating fluid from respective collectors rearwardly from the ducts.

4 Claims, 5 Drawing Figures

PATENTED JUL 22 1975 3,895,596

SHEET 1

AMPHIBIOUS VEHICLE

FIELD OF INVENTION

The present invention relates to vehicles and more particularly to amphibious vehicles.

BACKGROUND OF THE INVENTION

Amphibious vehicles may be divided into vehicles having alternate land and aquatic propulsion means, and single propulsion means. Alternate propulsion systems include vehicles having conventional land drives, and alternate conventional aquatic drives, such as propellers and the like. Single propulsion systems have been typified by track-mounted vehicles wherein turbulence resulting from traveling of the respective tracks is intended to propel the structure through the water. This has generally been unsuccessful in that unshrouded tracks tend to result in static equilibrium wherein force in the intended direction is neutralized by fluid drawn in the opposite direction by travel of track. Nevertheless, single propulsion vehicles are thought to be preferable to alternate propulsion amphibians in that they are more simple and compact structures.

Accordingly, it is an object of the present invention to provide an improved amphibious vehicle of the single unit propulsion type having a ducted propulsion vector system wherein backlash fluid drawn in a direction opposite to the intended direction of travel is drawn through a duct into the direction of the intended travel.

It is a further object of this invention that the aforesaid amphibious vehicle have a simple steering system integrally related to the propulsion system.

These and other objects shall become apparent from the description following, it being understood that modifications may be made without affecting the teachings of the invention here set out.

SUMMARY OF THE INVENTION

The amphibious vehicle, comprises a body-frame, having an inverted U-shaped duct at each rectilinear side of the body-frame extending to distally above the ground line; an engine mounted in the body-frame; and a drive train assembly including a row of wheels in each of the ducts, means for mechanically connecting the wheels, means for transmitting and mechanically connecting the wheels to the engine, and deflectors mounted forwardly and above each of the wheels for receiving fluid drawn upwardly by rotation of the wheels, and conduits disposed rectilinearly in the interior top wall of each of the ducts communicating fluid from respective collectors rearwardly from the ducts.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
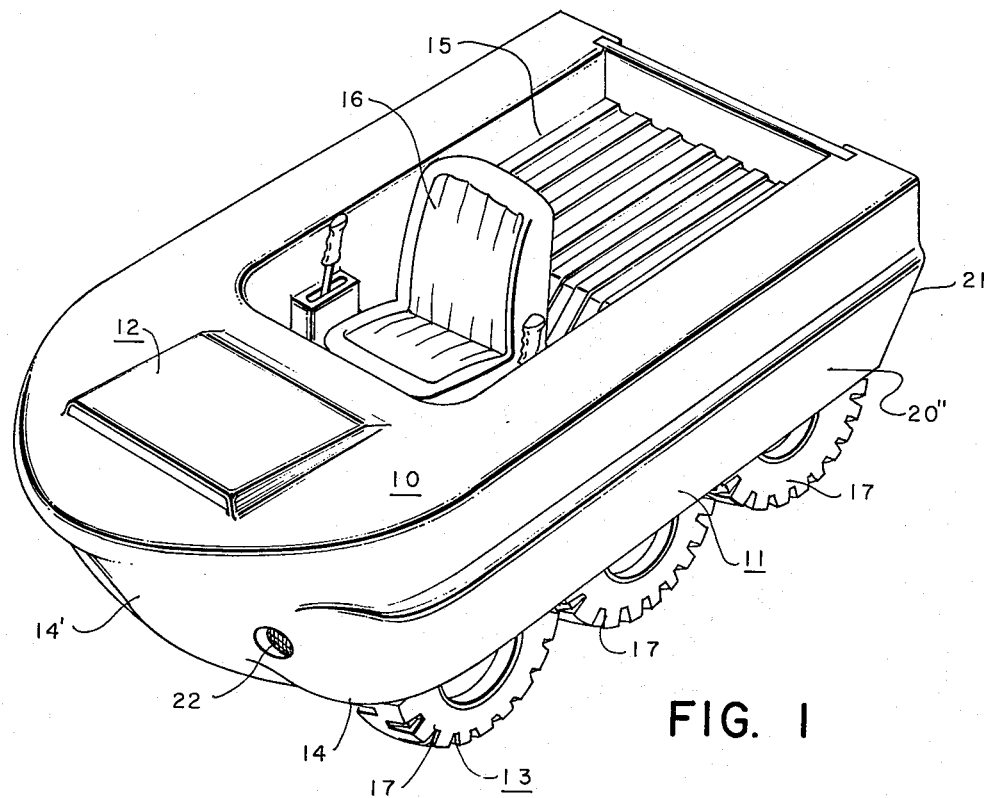
FIG. 1 is a left front perspective view of the present amphibious vehicle.

Referring now to the drawings and more particularly to the FIG. 1, the amphibious vehicle of this invention is shown to advantage and generally identified by the numeral 10. The vehicle 10 comprises a chassis-body 11, an engine 12, and a drive assembly 13. The chassis-body 11 includes a suitable frame integrally tied to a body 14. The body 14 may be a semirectangular solid provided with a prow-like nose portion 14'. Within the body 14 is a passenger-cargo compartment 15 having seats 16 and the like. The engine 12 may be mounted in the prow portion 14'.

Figure 2:
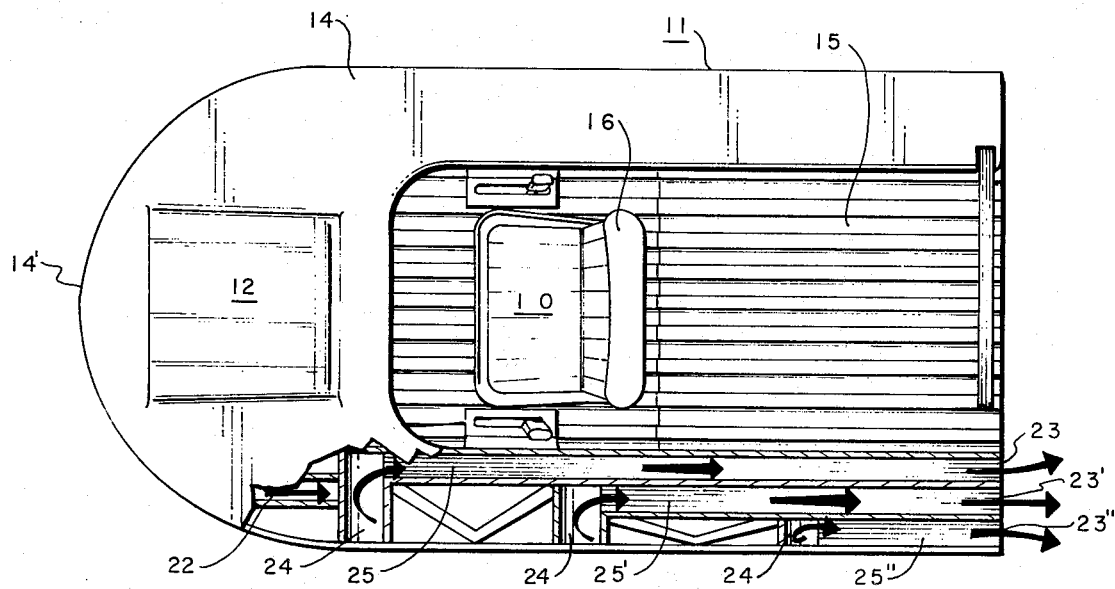
FIG. 2 is a top plan view of the apparatus of the FIG. 1 shown with one of the top duct walls broken away and vector arrows for illustrative purposes.
Figure 3:
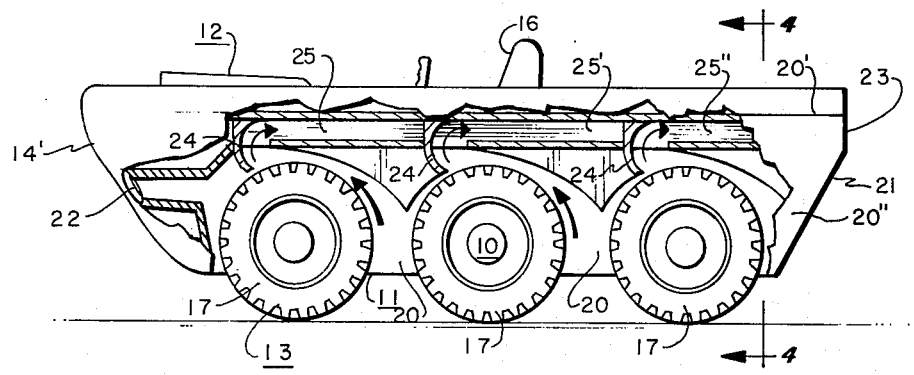
FIG. 3 is a left side elevational view of the amphibious vehicle with the duct walls broken away and vector arrows.
Figure 4:
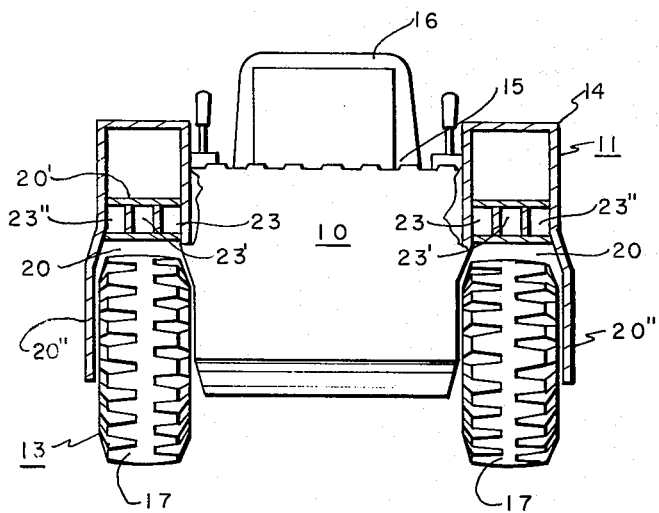
FIG. 4 is an end elevational, cross-sectional view taken substantially along the lines 4—4 of the FIG. 3.
Figure 5:
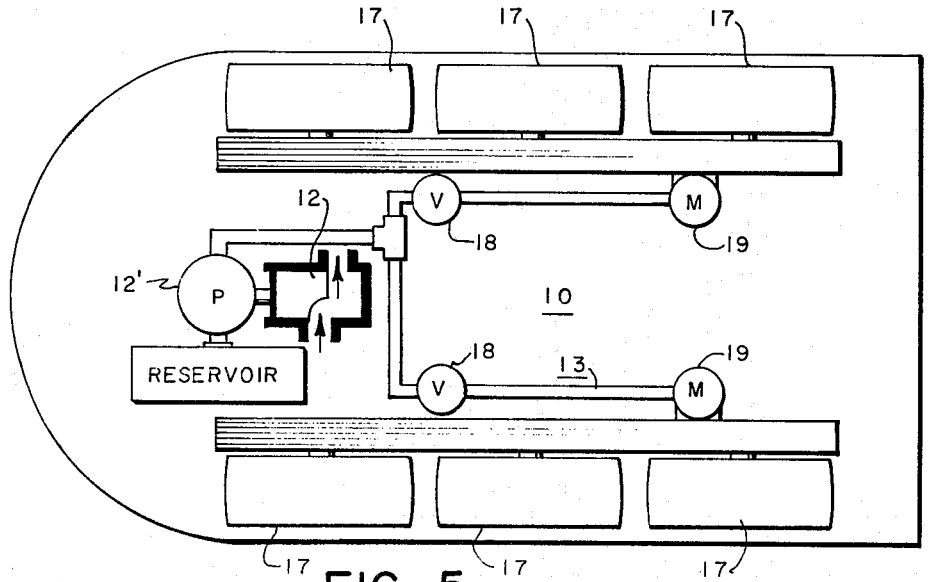
FIG. 5 is a bottom plan, semidiagrammatic view of the engine and drive train assembly of the present vehicle.

Referring to the FIGS. 2, 3 and 4, the drive train assembly 13 is powered by the engine 12 and hydraulic pump 12'. As shown more clearly in the FIG. 5, the drive train 13 comprises a pair of rectilinearly disposed rows of wheels 17 and a pair of valves 18 controlling each of the respective rows of wheels 17. Each of the wheels 17 may be mechanically connected to other wheels 17 in its respective row and driven by a single hydraulic motor 19 and means such as sprocket and chain (not shown); or by a motor 19 provided for each wheel 17 and connected by a valve 18 of each row. It is to be understood that both rows of wheels 17 may be controlled from a single hydraulic motor and that other steerable wheels may be provided for control. It is to be understood that a suitable mechanical system may operate in place of the hydraulic system described herein, with a transmission and gear box in place of the valves and hydraulic motors.

Referring again to the FIGS. 2, 3 and 4, the rows of wheels 17 are mounted in ducts 20 at each rectilinear side of the body 14. Each of the ducts 20 are configured as inverted U-shaped enclosures which issue downwardly from the body 14 distally above the ground line. That is, each duct 20 is formed by walls of the passenger-cargo compartment 15, a top wall 20' issuing outwardly and horizontally from the upper portion of the body 14, and an outside, guard wall 20'' issuing downwardly from the wall 20' having its lowermost edge distally above the ground line, and parallel to the wall of compartment 15. The prow portion 14' encloses the forwardmost terminal ends of the ducts 20, and a baffle plate 21, issuing from the rearwardmost terminal end of the body 14, encloses the rearwardmost terminal ends of the ducts 20. It may be seen that the baffle plate 21 also provides a mudflap which may restrict material ordinarily thrown by rotation of the wheels 17.

The prow-like portion 14' is provided with apertures 22 which communicate with each of the ducts 20. As shall become apparent, the apertures 22 may be substantially horizontal (not shown) or inclined downwardly as shown in the FIG. 3. The rearward end of the ducts 20 discharge through the baffle plate 21 through orifices 23, 23' and 23''. The forwardmost wheel 17 is provided with a deflector 24 which is operable to collect fluid drawn upwardly by forward rotation of the wheel 17, and with a conduit 25 which communicates fluid collected by the deflector 24 to the orifice 23. The deflector 24 is disposed above and distally forward the uppermost center of the wheel 17 and may be suitably curved to facilitate collection and deflection of fluid from the wheel 17. The conduit 25 runs along the top wall 20' to the orifice 23. Similarly, wheels 17, rearwardly of the forwardmost wheels 17, are each provided with deflectors 24 which are mounted forwardly and above each respective wheel 17, as set out above. Each deflector 24 is provided with conduits 25' and 25" communicating with other orifices 23' and 23", respectively. It may be seen that the conduit 25, 25' and 25" may converge into a single orifice 23. It may also be seen that more or fewer wheels 17 may be used to similar advantage.

In operation, the amphibious vehicle 10 may be driven on land by engaging the valves 18 of the respective motors 19 to provide motion in a desired direction. Turning may be accomplished by activating one of the motors 19 of one side while holding the other motors 19 in neutral or reverse to cause the vehicle 10 to pivot. Motion in the water is accomplished by identical operation of the valves 18, motors 19 and wheels 17. In aquatic travel the motion of the lower arc of the wheels causes turbulence in the water much like a paddle wheels, while motion of the upper arc draws water into the deflectors 24 and forcing it through the conduits 25, 25' and 25" and out their respective orifices 23, 23' and 23" causing a jet-like action, thus causing a net propulsive force to the vehicle 10. It may be seen that wheels having substantial relieved ribs or tread may increase traction on land and turbulence in the water.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. An amphibious vehicle, comprising:
a body-frame, having an inverted U-shaped duct at each respective side of said body-frame extending above the ground line, the forwardmost terminal ends of said ducts are enclosed by a prow-like nose of said body-frame, said prow-like nose portion having apertures through which fluid may be communicated to said wheels, and wherein the rearwardmost terminal ends of said ducts are enclosed by baffle plates issuing sidewardly from said body-frame,
an engine mounted in said body-frame; and
a drive train assembly including a row of wheels in each of said ducts, means for mechanically connecting said rows of wheels, said wheels being communicatingly interconnected with said engine, said ducts having deflectors mounted forwardly and above each of said wheels for receiving fluid drawn upwardly by rotation of said wheels, and conduits disposed rectilinearly in the interior top wall of each of said ducts communicating fluid from respective deflectors rearwardly from said ducts the rearwardmost ends of said conduits ending in orifices issuing through said baffle plates.

2. The apparatus of claim 1 wherein each row of wheels is provided with a separately controlled hydraulic motor connected to said engine by a hydraulic pump.

3. The apparatus of claim 1 wherein said apertures are inclined downwardly to the lower arc of said wheels.

4. The apparatus of claim 1 wherein said conduits converge into a single orifice at the rearwardmost end of each duct.

* * * * *